UNITED STATES PATENT OFFICE.

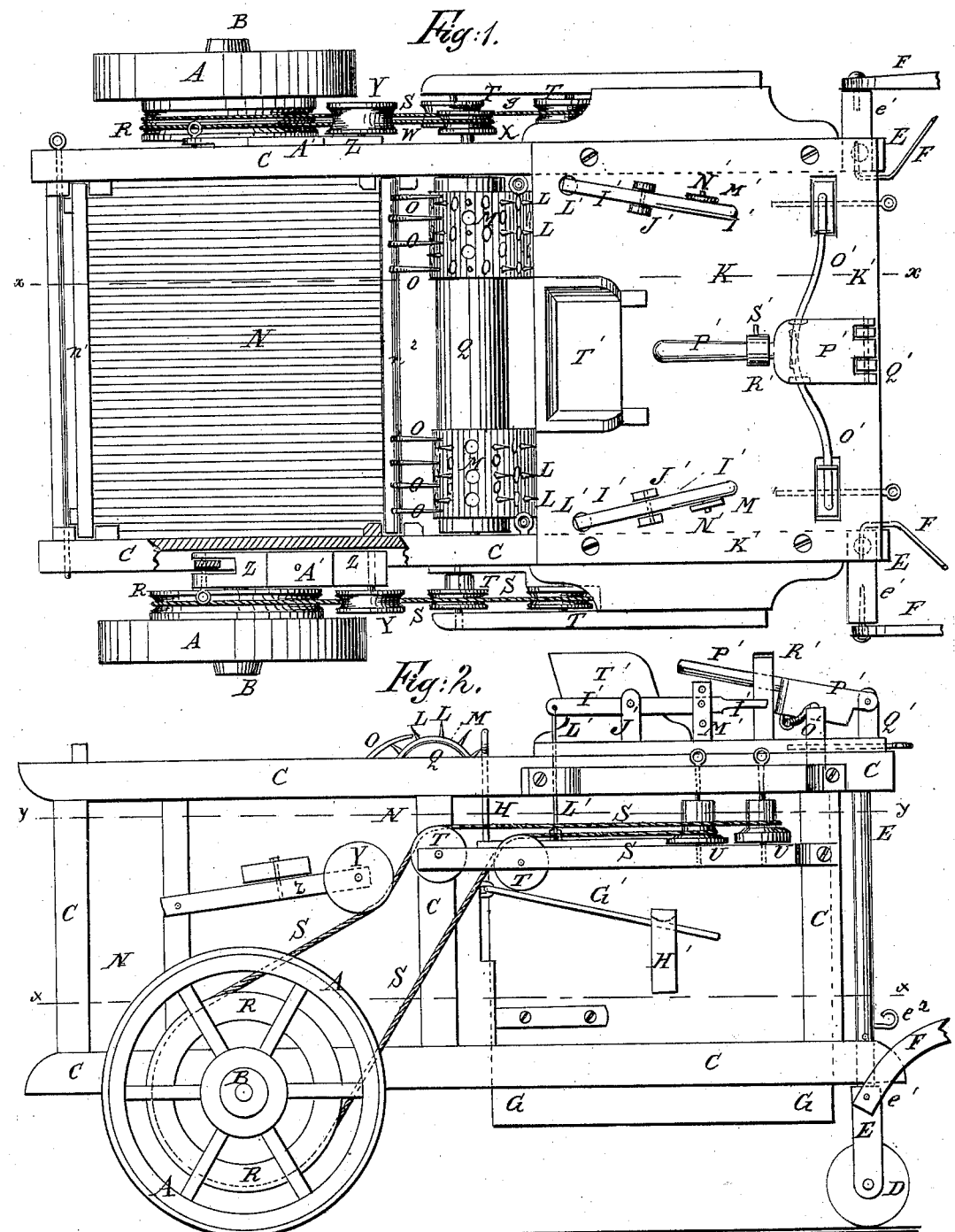

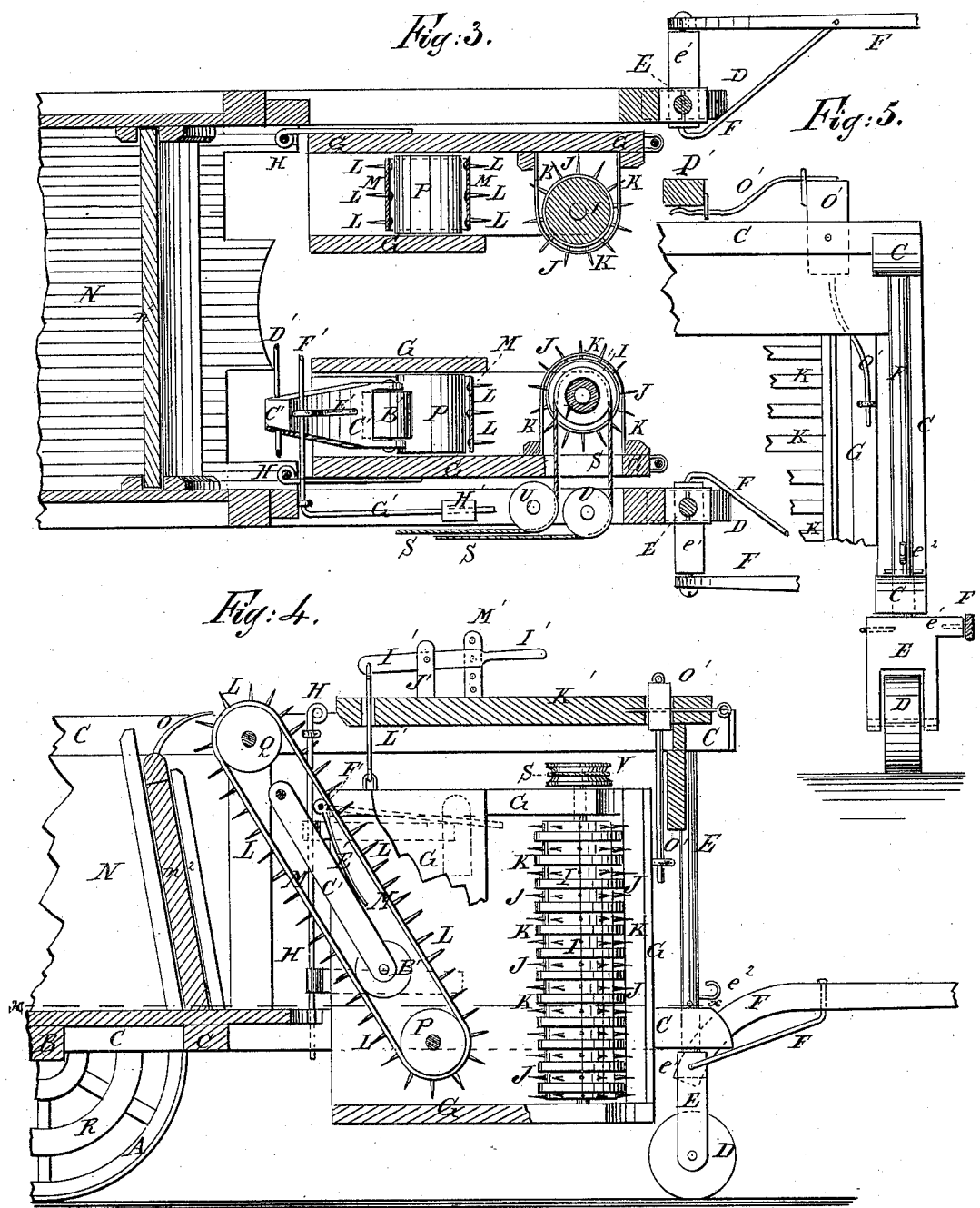

ROBERT H. PIRTLE, OF LOWE'S, KENTUCKY.

IMPROVEMENT IN COTTON-HARVESTERS.

Specification forming part of Letters Patent No. 212,740, dated February 25, 1879; application filed November 5, 1878.

*To all whom it may concern:*

Be it known that I, ROBERT HENRY PIRTLE, of Lowe's, in the county of Graves and State of Kentucky, have invented a new and useful Improvement in Cotton-Pickers, of which the following is a specification:

Figure 1, Sheet 1, is a top view of my improved machine. Fig. 2, Sheet 1, is a side view of the same. Fig. 3, Sheet 2, represents two horizontal sections of the same, the upper half, or that portion nearest the top of the sheet, being in line $x$ $x$ of Fig. 2, and that portion nearest the bottom of the sheet being in line $y$ $y$ of same figure. Fig. 4 of Sheet 2 is a vertical section in line $x$ $x$ of Fig. 1, a portion of the inner side of box G being broken away. Fig. 5, Sheet 2, is a detail front view of a part of the forward end of the machine.

Similar letters of reference indicate corresponding parts.

The object of this invention is to furnish an improved machine for picking cotton from the plants in the field, which shall be simple in construction, comparatively inexpensive in manufacture, of light draft, and effective in operation.

The invention will first be described in connection with the drawings, and then pointed out in the claims.

A are the drive-wheels, which revolve upon the journals of the axle B. To the axle B is attached the rear part of the frame C. The forward end of the machine is supported by the caster-wheels D, the standards E of which pass up through and work in holes in the forward ends of the side bars of the frame C, the ends of the lower side bars of the said frame C resting upon cross-heads $e^1$, formed upon or attached to the said standards just above the wheels D. The cross-heads $e^1$ also serve as supports for the attachment of the thills F. To the standards E, just above the ends of the lower side bars of the frame C, are attached draft-hooks $e^2$, to which the horses are attached.

G are two boxes, which are made open at their rear and forward ends and at the forward part of their inner sides. The boxes G are hinged at their outer rear corners to vertical rods H, attached to the frame C in such a way that the said boxes may be slid up and down upon the said rods, according as the height of the plants to be operated upon may require. To the forward parts of the top and bottom of the boxes G are pivoted the ends of two cylinders, I, to which are attached circular rows of teeth J.

The teeth J project through the spaces between the metal straps K, which are bent into U form and passed around the inner sides of the toothed cylinders I J. The ends of these strips are attached to the inner surface of the outer sides of the boxes G, or to cleats attached to the said sides.

By this construction, as the machine is drawn forward, the teeth J of the cylinders I take hold of the fibers of the cotton, draw it from the plants, and carry it back into the boxes G. As the teeth J pass in between the rear parts of the straps K they are withdrawn from the cotton, leaving the said cotton in the middle parts of the boxes G, whence it is taken by the teeth L of the endless belts M and dropped into the receiving-box N, formed in the rear part of the frame C.

The rear end-board, $n^1$, and the forward end-board, $n^2$, are made detachable, their ends sliding in grooves or spaces between cleats attached to the side-boards of the said box N, in the manner of the end-boards of a wagon-box.

To the upper edge of the forward end-board, $n^2$, are attached fingers O, which project upward and are curved forward, so as to pass between the rows of teeth L of the endless belts M, to remove the cotton from the said teeth and allow it to fall into the receiving-box N.

The endless belts M pass around rollers P, pivoted to the lower part of the sides of the boxes G, and around the roller Q, pivoted to the upper side-bars of the frame C.

To the inner sides of the drive-wheels A are attached pulleys R, around which are passed endless bands S. The bands S pass around guide-pulleys T and U, pivoted to supports attached to the sides of the frame C, and around pulleys V, attached to the projecting ends of the upper journals of the toothed cylinders I J, so that the said cylinders may be revolved by the advance of the machine.

One of the pulleys, R, is made double, and around it is passed an endless band, W. The band W is crossed and is passed around a pulley, X, attached to the projecting end of a journal of the roller Q, so that the said roller may be revolved in the proper direction by the advance of the machine.

The endless bands S are kept taut as the boxes G are swung upon their hinges by the idlers Y, which rest upon them, and which are pivoted to the free ends of the bars Z, the other ends of which are pivoted to the frame C, and to which are attached weights A', to hold the idlers Y down upon the bands S with the required force.

The toothed belts M are kept taut by the idlers B', which are pivoted to the lower ends of the bars C'. The upper ends of the bars C' are pivoted to a rod, D', the ends of which are attached to the frame C. Against the forward sides of the bars C' rest the ends of arms E', formed upon or attached to the rods F', which work in bearings in the frame C, and to the ends of which are attached, or upon which are formed, arms G', which project forward, and have weights H' attached to them to hold the idlers B' against the toothed belts L M with the requisite force.

This device is especially designed to take up the slack of the toothed belts L M when the boxes G and their attachments are raised.

The boxes G are raised and lowered by means of the levers I', which are pivoted to supports J', attached to the platform K', secured to the forward parts of the top bars of the frame C.

To the rear ends of the levers I' are pivoted the upper ends of the rods L', the lower ends of which are attached to the upper rear parts of the boxes G. The forward parts of the levers I' move along the sides of the uprights M', the lower ends of which are attached to the platform K', and which have a number of holes formed in them to receive pins N', attached to the sides of the said levers I', to hold the boxes G securely in any position into which they may be adjusted.

O' are two bent levers, the lower arms of which pass down through and are pivoted in holes in the platform K'. The lower parts of the lower arms of the levers O' pass through keepers attached to the forward ends of the boxes G, so that the said boxes can be raised and lowered without affecting the said levers O'. The upper arms of the levers O' project inward, and their ends rest against the lower side of the lever P', the forward end of which is hinged to a support, Q', attached to the forward middle part of the platform K'.

The rear part of the lever P' passes along the side of an upright, R', or through the loop or slotted upright R'. The lower end of the upright or loop R' is attached to the platform K', and in the said upright or loop R' is formed a number of holes to receive a pin, S', attached to the side of the lever P', to hold the said lever P' securely in any position into which it may be adjusted.

By this arrangement, by operating the lever P' the boxes G and their attachments may be swung toward or from each other, as the size of the plants or other circumstances may require.

T' is the driver's seat, which is attached to the platform K' in such a position that the driver can readily reach and operate the three levers I' I' P from the said seat.

The U-shaped metal straps K should be adjustable, so that they may be moved forward or backward by means of a lever or other suitable means, to make the projecting parts of the teeth J shorter or longer, as may be required, the said straps thus serving as clearers, at the same time that they regulate the length of the teeth.

Having thus described my invention, I claim as new and desire to secure by Letters Patent—

1. The combination, with the toothed belts L M, of the pivoted idlers B', pivoted bars C', rod D', rocking rods F', having arms E', and the weighted arms G', as and for the purpose specified.

2. In a cotton-picker, the toothed cylinders I, pivoted to boxes G, that are open at front, rear, and forward part of inner sides, and hinged as well as sliding on rods H, as and for the purpose set forth.

3. The levers O', having upper arms that rest at their ends against lower side of lever P', and lower arms that pass through keepers on the forward ends of the boxes G, as and for the purpose described.

ROBERT HENRY PIRTLE.

Witnesses:
J. P. MORRILL,
LUCIEN M. PALMER.